UNITED STATES PATENT OFFICE.

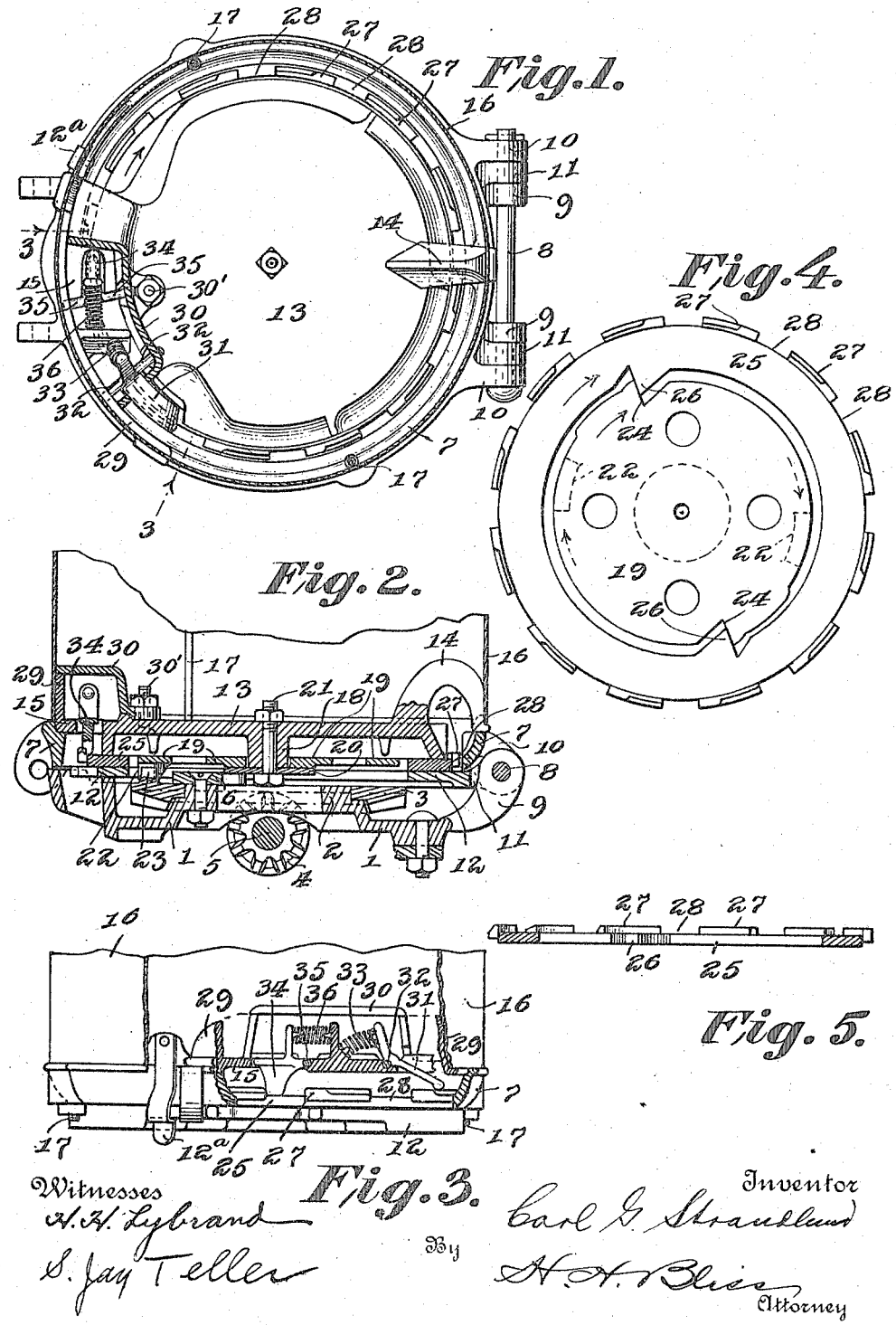

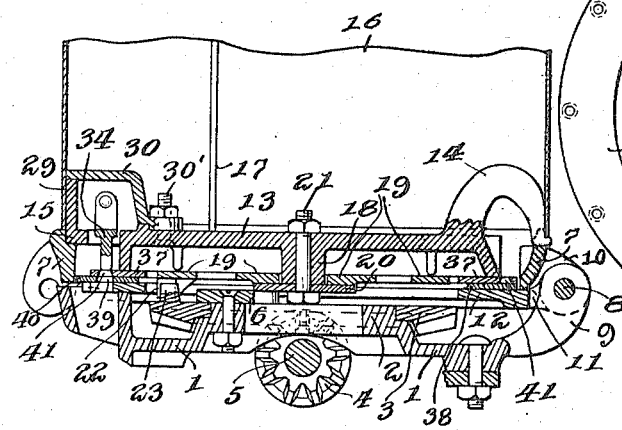

CARL G. STRANDLUND, OF MOLINE, ILLINOIS, ASSIGNOR TO DEERE & COMPANY, OF MOLINE, ILLINOIS, A CORPORATION OF ILLINOIS.

PLANTING MECHANISM.

1,286,443.      Specification of Letters Patent.      Patented Dec. 3, 1918.

Application filed November 11, 1914. Serial No. 871,570.

*To all whom it may concern:*

Be it known that I, CARL G. STRANDLUND, a citizen of the United States, residing at Moline, in the county of Rock Island and State of Illinois, have invented certain new and useful Improvements in Planting Mechanisms, of which the following is a specification, reference being had therein to the accompanying drawings.

The invention relates especially to the seeder mechanism which serves to separate the seeds to be planted from the general mass of seeds in a hopper, to count the seeds and to deliver them, one by one, to a suitable dropping mechanism.

The object of the invention is to provide a seeder mechanism which can be readily modified to adapt it for the planting of corn or for the planting of other smaller seeds. When corn is to be planted the corn kernels are separated from the general mass of kernels and are received by the counting devices in vertical edgewise positions. When other seeds are to be planted which are more nearly spherical in shape and smaller in size they are received in small cells each adapted to hold one or more seeds. Stated more specifically, the object of the invention is to provide a mechanism adapted to receive a relatively thick seed plate adapted for the edgewise selection of corn kernels or to receive a relatively thin seed plate adapted for the selection of smaller spherical seeds; and to provide a knock-out device adapted to enter the cells of the thick plate to eject the kernels therefrom, or to ride over the tops of the cells of the thin plate to prevent more than a single kernel from entering or from remaining in the cell.

In the accompanying drawings I have shown only those parts of the mechanism which are essential for an understanding of my present invention, and it will be understood that these are intended to be combined with the other usual or preferred parts necessary to form a complete planter.

Of the drawings,

Figure 1 is a plan view, partly in section, of a mechanism embodying the invention, a thick plate for the edgewise selection of corn kernels being shown in place;

Fig. 2 is a vertical sectional view taken through the center of the mechanism shown in Fig. 1;

Fig. 3 is a side elevation of the mechanism shown in Fig. 1, some of the parts being broken away and shown in section along the line 3—3 of Fig. 1;

Fig. 4 is a plan view of the thick seed plate and of the driving plate which is adapted for driving either the thick seed plate, as shown, or a thin seed plate;

Fig. 5 is a vertical sectional view taken through the center of the thick seed plate;

Fig. 6 is a vertical sectional view through the seeder mechanism and is similar to Fig. 2, but shows a thin seed plate in place;

Fig. 7 is a view similar to Fig. 3, but showing a thin seed plate instead of a thick seed plate;

Fig. 8 is a plan view of the thin seed plate shown in Figs. 6 and 7;

Fig. 9 is a side view of the thin seed plate;

Fig. 10 is a plan view of a supplemental filler plate intended to be used in combination with the thin seed plate;

Fig. 11 is a side view of the filler plate.

Referring to the drawings, 1 represents the base casting which is secured to the main framework of the planter and which serves to support the parts of the seeder mechanism to which the invention especially relates. The casting 1 is provided with an upward projecting circular boss 2, upon which there is journaled a bevel gear 3. This gear meshes with the bevel pinion 4 on a transverse seeder shaft 5. The gear 3 is held in place on the casting by means of a suitable cap plate 6.

7 is the hopper base ring which is pivotally mounted on the base casting 1 by means of a horizontal pintle pin 8 extending through apertures in ears 9 and 10, secured respectively, to the castings 1 and 7. Also pivoted on the pin 8 by means of ears 11 is a supporting plate 12 which can be releasably locked to the hopper base ring 7 by means of the spring clip 12$^a$.

Supported on the ring 7 is a cap plate 13 which covers the entire central part of the mechanism, but is separated from the ring 7 along the greater part of the periphery. The plate 13 is connected with the ring 7 at one side by means of a bridge 14 and at the other side is extended at 15 to directly engage the ring. 16 is the hopper proper which rests on the ring 7 and engages the edge parts of the plate 13. The hopper is held in place on the ring by means of the bolts 17, 17.

The cap plate 13 is provided at its center with a depending circular boss 18 and on this boss there is journaled the seed plate driver 19. The driver is held in place by means of the washer 20, which is secured to the boss 18 by means of the bolt 21. The driver 19 is provided with depending lugs 22 adapted to engage and coöperate with upstanding lugs 23 on the drive gear 3. The driver 19 is provided with notches 24 adapted to receive lugs formed on the seed plate and to be referred to below.

25 represents the seed plate or ring which is adapted to lie between the supporting plate 12 and the cap plate 13, and to surround the driver 19. The plate is provided with inward projecting lugs 26 adapted to enter the notches 24 in the driver. It will be seen that the plate can be driven in the direction indicated by the arrows in Fig. 4 by means of power initially applied to the seeder shaft 5. The power is transmitted from the shaft 5 to the pinion 4 and the gear 3, and thence to the driver 19 and the plate 25. The plate is provided at its periphery with a plurality of similar equally spaced outward projecting teeth 27, 27 between which there are formed seed cells 28, 28. The teeth project upward above the top surface of the body part of the plate. The outer walls of the cells 28, 28 are formed by the inner surface of the hopper base ring 7. Each cell is of such a size and shape as to be adapted to receive a single kernel of corn on edge with its longitudinal axis horizontal. The walls of the plate 13 and of the ring 7 are oppositely inclined above the plate so as to provide a downward narrowing channel adapted to guide the seeds and assist their movements into proper positions in the cells.

The plate 13 is provided with an upstanding wall 29 along the part of its periphery adjacent the aforesaid extension at 15. This wall serves as a part of the housing for the cut-off and knock-out devices to be described. The housing is made complete by the cover 30, which is detachably held in place by means of the bolt 30'. Mounted within the housing is the vibratable cut-off device 31, which is supported on trunnions 32. A spring 33 tends to hold the device always in its lowermost position, as shown in Fig. 3. When in this position the device is adapted to engage any seeds which may be supported on top of the seed plate or partly entered into the cells thereof. This device prevents any of the seeds not fully entered in the cells from passing onward to the place of discharge.

34 is the knock-out device vibratably mounted in the housing by means of the trunnions 35, 35. A spring 36 serves to press the device downward and to force it into each cell as it comes into register. As the device enters the cell it forces the contained seed downward therefrom. The supporting plate 12 and the supporting casting 1 are provided with registering openings to permit the seed to pass downward to suitable valve devices which are not shown, as they of themselves constitute no part of the present invention.

Figs. 6 and 7, for the most part, show the same mechanism shown in Figs. 1, 2 and 3, and a repetition of the detailed description will not be necessary. Instead of the thick seed plate 25 there is provided a relatively thin seed plate 37 and a blank filler plate 38. The filler plate rests directy on the supporting plate 12 and is provided with an aperture 39 which registers with the aforesaid apertures in the plate 12 and the casting 1 for the passage of seeds to the dropping mechanism. The plate 38 is provided with a boss 40 which engages the ring 7 to prevent the plate from turning.

The seed plate or ring 37 has approximately the same inner and outer diameters as the plate 25, and is similarly provided with lugs 26ª to engage with the driver 19. The plate is of the same thickness throughout and is provided near its periphery with horizontally inclosed seed cells 41, which are preferably circular. Preferably also each cell diverges downward, that is, each cell is larger at its bottom than at its top. Each of the cells 41 is adapted to hold a single seed of relatively large size, as, for instance, a pea, or, when smaller seeds, such as broom corn kernels, are to be planted, each cell may hold two or three, according to the size of the seeds.

As shown in Fig. 7, the cut-off device 31 is so limited as to its downward movement as to be inoperative when the thin plate 37 is in use. The knock-out device 34 is much larger than the cells 41 and therefore can not enter them as it did the cells 28 in the plate 25. The device 34 therefore serves as a brush or cut-off device when the plate 37 is in use and acts to prevent more than a single kernel from entering a single cell and being discharged. The diverging sides of the cells 41 insure the discharge of the seeds therefrom by gravity without the action of any positive ejecting device.

It will be understood that the device 34 is yieldable upward under the action of the spring 36 so that it will permit the passage without crushing of any seeds which may project upward out of the cells slightly above the top of the plate.

With the parts described I provide for planting either of two very different kinds of seeds though retaining the same hopper and bottom structure, and the same seed-plate-chamber as concerns parts and dimensions. This common chamber has a bottom plate support 12, an upper holder for the plate provided by the cap plate 13 and its down-turned flanges, and an annular edge holder provided by the lower portion of the part 7. These are fixed in their relations to each other so that to interchange plates it is merely necessary to throw the hopper back on its hinge and take out the integral seed plate having deep through cells 28 and insert the two-part plate 37, 38, and again close the hopper. The two-part plate fits snugly but loosely in the same plate chamber and contacts with the bottom support, the upper holder and the annular holder exactly as the integral plate contacted therewith. The thickness dimension of the composite plate 37, 38, is exactly the same along the lines of contact with the upper holder as the thickness dimension of the integral plate. But the cut-off, being normally held positively against descent below a fixed horizontal plane, does not contact with the upper surface of the upper rotary element of the composite seed plate; the seeds which are dispensed by the composite plate being so small that it is desirable to avoid the thrusting action of the cut-off. The device which serves as a knock-out (when the integral plate, for large seeds, is in use, and normally lies within these cells) is of such cross-area that it cannot enter the smaller cells, and is so positioned as to merely cover them at the times when the seeds are dropping freely from the downwardly flared apertures.

What I claim is:

1. In a planting mechanism, a hopper, a bottom structure with a seed-plate-chamber of fixed dimensions having a bottom support an upper holder and an annular edge holder for a seed plate and adapted to retain loosely a detachable integral solid seed plate with relatively deep through cells holding corn kernels edgewise, a cut-off normally held positively against descent below a fixed horizontal plane, and a knock-out normally in horizontal planes below the tops of said cells, in combination with a two-part seed plate device having an upper rotary element below said plane of the cut-off and formed with shallow cells of less cross-area than the knock-out and having a lower non-rotary element with a cell closing surface above the plane of the bottoms of the deep cells, the said two-part seed plate being adapted to fit in the said seed-plate-chamber and to loosely contact with the said plate support and plate holders.

2. In a planting mechanism, a hopper, a bottom structure with a seed-plate-chamber having a bottom plate support and an upper holder for a seed plate, the support and holder being normally at a fixed distance apart and said chamber being adapted to retain loosely a detachable integral solid seed plate with deep through cells for holding corn kernels edgewise, a cut-off normally held positively against descent below the relatively high horizontal plane of the top edges of the corn kernels, and a knock-out dimensioned to enter and be normally positioned in and below the tops of said seed cells, in combination with a withdrawing and discharging device for small seeds having a thin rotary plate with shallow through cells of less cross-area than the knock-out and a device for elevating said thin plate and holding its upper surface close to the plate holder above said chamber and with the upper ends of the cells in a horizontal plane below that where the cut-off is positively stopped.

In testimony whereof, I affix my signature, in presence of two witnesses.

CARL G. STRANDLUND.

Witnesses:
JESSIE SIMSER,
W. G. DUFFIELD.

Copies of this patent may be obtained for five cents each, by addressing the "Commissioner of Patents, Washington, D. C."